United States Patent [19]

Poletto

[11] Patent Number: 4,908,856
[45] Date of Patent: Mar. 13, 1990

[54] SWITCHING VOLTAGE REGULATOR FOR AN INTERFACE CIRCUIT IN A TELEPHONE SUBSCRIBER LINE

[75] Inventor: Vanni Poletto, Alessandria, Italy

[73] Assignee: SGS-Thomson Microelectronics S.r.l., Agrate Brianza Mi, Italy

[21] Appl. No.: 165,808

[22] Filed: Mar. 9, 1988

[30] Foreign Application Priority Data

Mar. 24, 1987 [IT] Italy ................... 19817 A/87

[51] Int. Cl.⁴ .................................. G05F 1/44
[52] U.S. Cl. ................................... 379/413; 323/282
[58] Field of Search ............... 379/399, 405, 413, 412, 379/324, 387; 323/282, 283, 285

[56] References Cited

U.S. PATENT DOCUMENTS

| | | | |
|---|---|---|---|
| 3,733,540 | 5/1973 | Hawkins | 323/282 X |
| 4,196,320 | 4/1980 | Townsend | 379/413 X |
| 4,465,967 | 8/1984 | Tokunaga et al. | 379/324 X |
| 4,511,763 | 4/1985 | Skidanenko et al. | 379/413 |

OTHER PUBLICATIONS

"Getaktete Netzteile für Hohe Ströme", Elektroniker, No. 13, 1979, pp. 15-16.

*Primary Examiner*—Jin F. Ng
*Assistant Examiner*—Randall S. Vaas
*Attorney, Agent, or Firm*—Rosen, Dainow & Jacobs

[57] ABSTRACT

A so-called switching voltage regulator for an interface circuit in a telephone subscriber line, being of a type adapted to control the on/off states of an electronic switch, connected to the interface circuit and consisting of first and second transistors interconnected into a Darlington arrangement, comprises an ON-state sensor connected as an input to the collector of the first transistor and an OFF-state sensor connected as an input to the base of the first transistor, and a pair of current extractor devices respectively associated with the related bases of the first and second transistors. Also provided are first and second current sources, each connected to a corresponding current amplifier. The first of the amplifiers powers both current extractor devices. The second amplifier and a third current source are connected to the base of the second transistor. A first gate has an input associated with the output of the OFF-state sensor via a storage cell, and a second gate has an input associated with the output of the ON-state sensor via a further storage cell. Each amplifier is respectively connected the outputs of the first and second logic gates, each gate receiving on the other input an appropriate enable signal from the regulator. The hold current source connected to receive the enable signal of the second logic gate. Such a regulator can minimize the current draw from the high voltage power supply (−50 Volts) and make the electronic switch connected to the telephone subscriber line switch faster.

12 Claims, 3 Drawing Sheets

SWITCHING VOLTAGE REGULATOR FOR AN INTERFACE CIRCUIT IN A TELEPHONE SUBSCRIBER LINE

This invention relates to a switching voltage regulator for an interface circuit in a telephone subscriber line, which regulator is of a type controlling the on/off states of an electronic switch connected in said circuit and comprising first and second transistors, interconnected in a Darlington arrangement.

Voltage regulators of the above-noted type are employed in electronic interfacing circuits designed to drive voice transmissions over a telephone subscriber line.

In particular, it is common practice for such regulators to voltage drive a telephone subscriber line interfacing and driving circuit, and to be connected to, and in turn, either supplied a low ($\pm 5$ V) level voltage or high level voltage (in the $-50$ V to $-80$ V range), depending on the subscriber line type to be driven.

Such regulators require, moreover, that the electric current draw for said power supplies be minimized, particularly for the high voltage supply, reducing as a result the amount of dissipated power.

Conventional regulators of the type noted above usually comprise a circuit portion operative to regulate the high voltage supply to an interfacing circuit in a subscriber line by turning on and off an electronic switch connected to said interface circuit.

As an example, a voltage regulator of the switching type and adapted to power an interface circuit referred to in the trade as a SLIC (Subscriber Line Interface Circuit) AMD, comprises a hysteresis comparator to the non-inverting input of which a control signal is applied to turn on and off an electronic switch formed by a pair of npn transistors connected to each other in a Darlington arrangement. This arrangement consists of interconnecting the collectors of the first and second transistors forming said pair, and of further connecting the emitter of the second transistor to the base of the first transistor.

The base of the second transistor is connected to a current source and to a triad of circuit devices respectively adapted to extract electric charge, extract current, and inject electric charge. By way of explanation, a charge extracting device is the equivalent of a current extractor which is only activated for a given time period to produce extraction of a predetermined quantity of electric charge from the base of the second transistor.

More specifically, as the comparator is input a signal exceeding a threshold value, it will output an enable signal to the charge extracting device which turns the second transistor off. The enable signal is also supplied to the current extracting device which, by drawing the current I supplied continuously from the cited current source connected to the base of the second transistor, will hold said second transistor in the off state.

Further, the enable signal is also supplied to the charge injection device through an inverter, with consequent deactivation of that device.

Turning the second transistor off automatically results in the first transistor connected thereto being turned off, and the switch comprised of said transistor pair is to be regarded as in its open state.

Likewise, a low logic value voltage signal applied to the comparator input causes its output to change output levels and the charge and current extractor devices to be consequently deactivated, to the benefit of the charge injector device and current source which will turn on the transistor pair forming the switch connected to the subscriber line interface circuit.

This prior approach, while substantially achieving its object, has the serious drawback that the aforesaid extractor and injector devices, the inverter and current source are all supplied the high level supply voltage ($-50$ V) and continuously draw a current I even when such draw is not strictly necessary. For example, no current would be required to hold the switch-forming transistors off, and during the off phase, only the charge extractor device would be necessary.

Likewise, during the on phase, in addition to the current source, the charge injector device would be required, while the other devices could be left in their off state.

Another serious drawback of the conventional circuit resides in its slow action. In fact, when using such charge and current extractor and injector devices, before the change of state of the electronic switch can take place, one is to wait for the transient on or off phase to be completed.

The technical problem underlying this invention is to provide a switching voltage regulator which affords the ability to change the state of the electronic switch with low current draw and irrespective of the transient on or off phase of the switch, thereby obviating the drawbacks noted above in connection with the background art.

This problem is solved by a switching voltage regulator which comprises first and second transistors interconnected in a Darlington arrangement; an ON-state sensor coupled to the collector of the first transistor; an OFF-state sensor coupled to the base of the first transistor; a first current extractor coupled to the base of the second transistor; a second current extractor coupled to the base of the second transistor; and control means coupled to receive an on signal for turning the first and second transistors on, an off signal for turning the first and second transistors off, and coupled to a source of power, the base of the second transistor, the ON-state sensor, the OFF-state sensor, the first current extractor and the second current extractor. In response to the on signal, the control means couples current from the source of power to the base of the second transistor to turn the first and second transistors on and the ON-state sensor on. In response to an ON-state signal from the ON-state sensor, the control means turns the ON-state sensor off. In response to an off signal, the control means ceases coupling of current from the power source to the base of the second transistor and turns the first and second current extractors on to cause the first and second transistors to turn off, and turns the OFF-state sensor on. The control means in response to an OFF-state signal from the OFF-state sensor turns the first and second current extractors off and the OFF-state sensor off.

According to one embodiment the control means comprises amplifiers, switches and logic circuitry including bistable devices. According to a specific embodiment, the switching voltage regulator comprises:

an ON-state sensor connected to the collector input of the first transistor;

an OFF-state sensor connected to the base input of the first transistor;

a pair of current extractor devices respectively associated with the related bases of the first and second transistors;

first and second current sources, each being connected to a corresponding current amplifier and a third hold current source, the first of said amplifiers being connected to both said extractor devices and the second amplifier and said hold current source being connected to the base of the second transistor;

first and second dual input logic AND gates, the first gate having an input associated with the output of said OFF-state sensor via a storage cell, and the second gate having an input associated with the output of said ON-state sensor via a further storage cell;

each said amplifiers being respectively tied operatively to the outputs of the first and second logic gates, each logic gate receiving at the other input an appropriate regulator enable signal and said hold current source being operatively connected directly to the enable signal supplied to the second logic gate.

The characteristics and advantages of the voltage regulator according to this invention will be more clearly understood from the following detailed description of an embodiment thereof, to be taken by way of example and not limitation in conjunction with the accompanying drawings.

Figure 1:
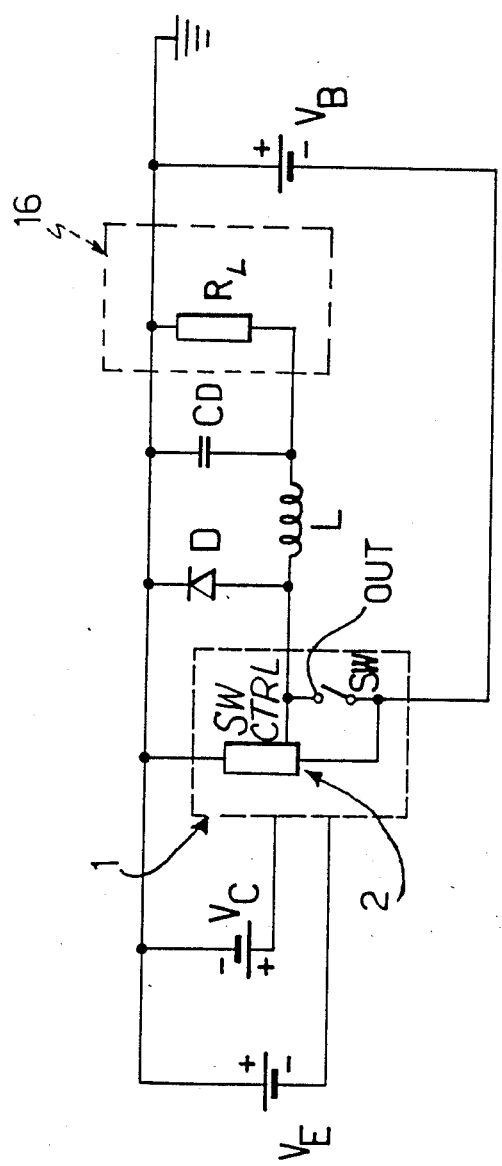
FIG. 1 is a schematical view of a switching voltage regulator and its connections to the supply voltage sources and a telephone subscriber line interface circuit.

With reference to the drawing views, the numeral 1 designates a voltage regulator which comprises a circuit portion 2 adapted to control the on/off states of an electronic switch SW connected to a telephone subscriber line interface circuit 16. This interface circuit is shown in the drawing connected to a resistive load represented by a resistor $R_L$.

The supply voltage $V_B$ has a high value, in the exemplary embodiment being described that value being −50 Volts, and powers the regulator 1 itself, which is also associated with a supply voltage pair, $V_C$ and $V_E$, at a low value equal to ±5 V, respectively.

Between said switch SW and the load $R_L$, there are conventional circuit components effective to limit the voltage peaks during the transient phases due to the switch SW being switched. Such components comprise a capacitor CD in parallel with the load $R_L$, an inductor L connected between one end of said capacitor CD and the output terminal OUT of the switch SW, and a diode D connected between the other end of the capacitor CD and the terminal OUT.

The electronic switch SW consists of a first transistor T1 and second transistor T2, interconnected in a Darlington arrangement, with the collectors C1 and C2 connected together, and the emitter E2 of the second transistor T2 connected to the base B1 of the first transistor T1. A resistor R is further connected between the base B1 and the emitter E1, which is also connected to the negative terminal of the voltage source $V_B$.

The collectors C1 and C2 form the aforementioned output terminal OUT.

Figure 2:
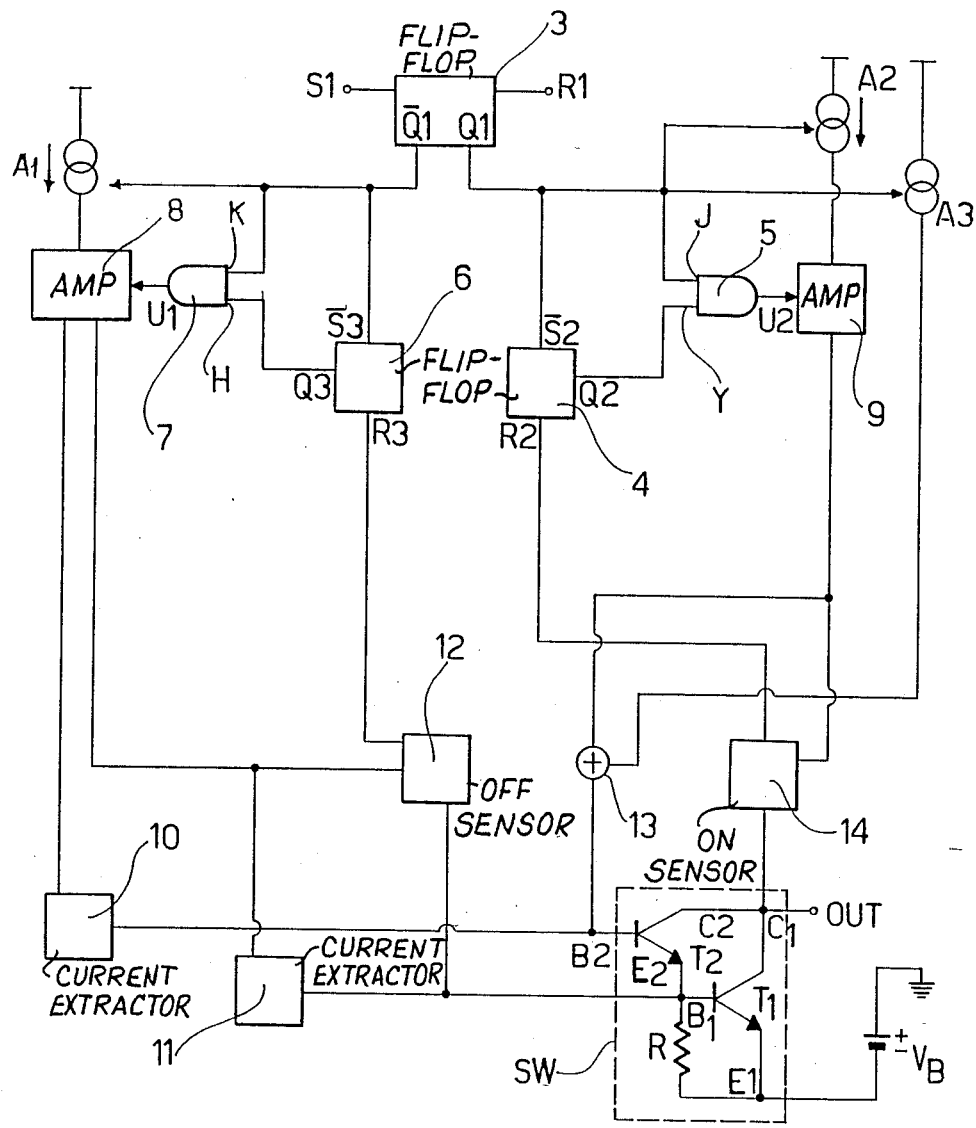
FIG. 2 shows a block diagram of the voltage regulator according to the invention.

With specific reference to the example of FIG. 2, the regulator 1 includes a first elemental storage cell 3 consisting of a bistable device (flip-flop) of a type referred to as SR on account of its having a first set input, indicated at S1, and a second reset input indicated at R1, and provided with respective outputs Q1 and $\overline{Q1}$ which will be referred to hereinafter as the non-inverting output and inverting output.

The non-inverting output Q1 is connected to the set input $\overline{S2}$ of a second bistable storage cell 4 consisting of a SR device (flip-flop) of a type adapted to switch on a negative-going transition at the input, and to an input J of a logic AND gate 5 with two inputs, which has its other input Y connected to the non-inverting output $Q_2$ of the second flip-flop 4.

The inverting output $\overline{Q1}$ of the first flip-flop 3 is connected to the set input $\overline{S3}$ of a third storage cell consisting of a bistable SR device (flip-flop), also of a type adapted to switch on a negative-going transition at the input, and to an input K of a second logic AND gate 7 with two inputs, which has its other input H connected to the non-inverting output Q3 of said third flip-flop 6.

First A1 and second A2 current sources are connected to a respective amplifier, 8 and 9, each adapted to increase the current signal value. Each amplifier is respectively connected to the output, U1 and U2, of said first 5 and second 7 logic AND gates.

The current amplifier 8 is connected to a pair of current extractor devices, 10 and 11, respectively connected to the base B2 of the second transistor T2 of the switch SW and to the base B1 of the first transistor T1 in the same switch.

The base B1 of that first transistor T1 is further connected to the input of an OFF-state sensor 12 connected to and powered by the amplifier 8, and having its output connected directly to the reset input R3 of the third flip-flop 6.

The second current amplifier 9, associated with the source A2, is connected with its output to the base B2 of the second transistor T2 via a summing node 13. A further third hold current source A3 is connected to the non-inverting output Q1 of the first flip-flop 3 with its output directly connected to said summing node 13 and, hence, to the base B2.

An ON-state sensor 14 is connected with its input to the collectors C1 and C2 of the transistors T1 and T2 forming the switch SW. The sensor 14 is connected to and powered by the second current amplifier 9 and has its output connected directly to the reset input R2 of the second flip-flop 4.

Figure 3:
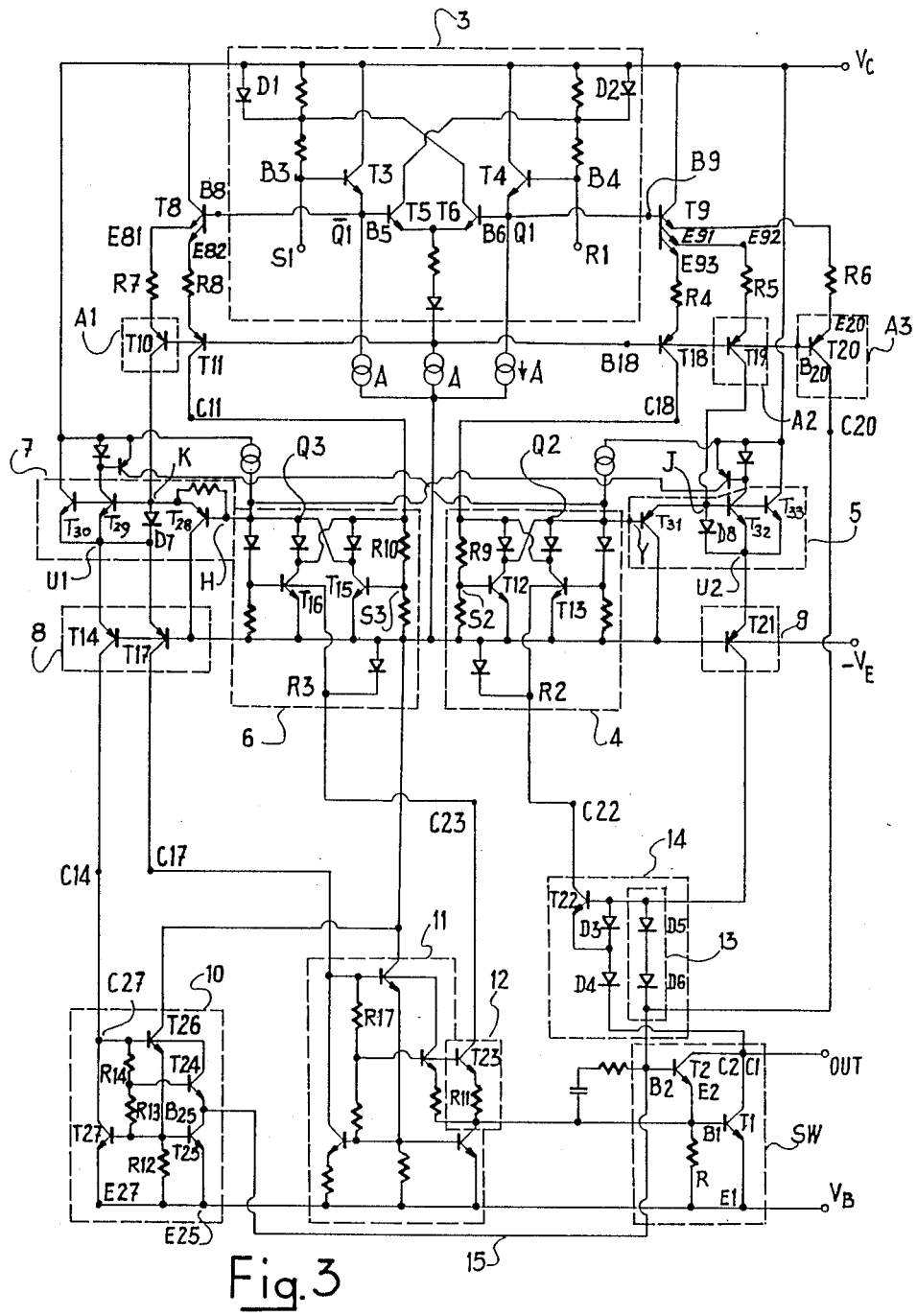
FIG. 3 shows a wiring diagram of the regulator of FIG. 2.

With particular reference to FIG. 3, there is shown in more detail a schematic view of the regulator 1 according to the invention.

The storage cell 3 comprises a conventional cross-coupled flip-flop including transistors T3 and T4 with respective bases B3 and B4 of which are associated the set input S1 and reset input R1. This flip-flop includes a further pair of emitter-coupled transistors T5 and T6 having their respective bases B5 and B6 connected to the emitters of the transistors T3 and T4 to provide the inverting output $\overline{Q1}$ and non-inverting output Q1 of the storage cell 3.

The collectors of the transistors T3 and T4 are connected directly to the positive supply voltage $V_C$ at a 5-Volt level, whereas the collectors of the transistors T5 and T6 are connected to the supply voltage $V_C$ via respective diodes D2 and D1.

Three bias current sources, collectively designated A, are conventionally associated with the negative supply voltage $-V_E$ at a −5-Volt level.

The non-inverting output Q1 of the cell 3 is connected directly to the base B9 of an npn transistor T9 having three emitters and whose collector is connected directly to the supply voltage $V_C$. The first, E91, of such emitters is connected via a resistor R6 to the emitter E20 of a pnp transistor T20 which functions as a switch and with a source of power; constitutes said third hold current source A3 connected to said summing node 13. The collector C20 of that transistor T20 is connected directly to the base B2 of the transistor T2 incorporated in the switch SW.

The remaining emitters, E92 and E93, of the transistor T9 are respectively connected via a resistor R5 and a resistor R4 to the respective emitters of a transistor T19 and transistor T18, both of the pnp type. The transistor T19 functions as a switch and with a source of power constitutes said second current source A2.

The bases B18, B19 and B20 of the respective transistors are conventionally connected to one another and to the negative supply voltage $V_E$, through a bias current source A.

The inverting output $\overline{Q1}$ of the flip-flop 3 is connected directly to the base B8 of a pnp transistor T8 having a pair of emitters E81 and E82. The first emitter E81 is connected to the emitter of a pnp transistor T10 via a resistor R7. The transistor T10 functions as a switch and with a source of power constitutes said first current source A1.

The second emitter E82 is in turn connected to the emitter of a pnp transistor T11 via a resistor R8. Said transistors, T10 and T11, have their bases connected to each other and to the negative supply voltage $V_E$ via the bias current source A.

The storage cells 4 and 6 are each comprised of a flip-flop with coupled emitters. More specifically, the cell 6 comprises the npn coupled emitter transistors T15 and T16 whose bases form the set input $\overline{S3}$ and reset input R3, respectively, for the flip-flop 6. Connected to the input $\overline{S3}$ is the collector C11 of the transistor T11 via a resistor R10.

The non-inverting output Q3 of the flip-flop 6 consists of the collector of transistor T15 and is connected to the base H of a pnp transistor T28 having the emitter K connected to the collector of the transistor T10 forming the source A1. Said transistor T28 forms, in combination with the npn transistors T29 and T30, and with the diode D7, a current amplifier serving the function of a logic AND gate 7, since a current appears on the output U1 of that amplifier only when the source A1 and the transistor T28, activated through its base H, are enabled simultaneously.

The logic gate 7 has an output U1 connected directly to the emitters of a transistor pair, T14 and T17, forming the amplifier 8 and having their bases connected to the negative supply voltage $V_E$. The amplifier 8 is thus operatively connected to the output U1 of the logic gate 7.

In a similar manner, the storage cell 4 comprises the transistors T12 and T13 with coupled emitters, whose bases respectively form the set input $\overline{S2}$ and reset input R2 for the flip-flop 4. The input $\overline{S2}$ is connected to the collector C18 of the transistor T18 via a resistor R9, and the non-inverting output Q2 of the flip-flop 4 is provided by the collector of the transistor T12 and connected to the base Y of a pnp transistor T31 having the emitter J connected to the collector of the transistor T19 which forms the current source A2. The transistor T31 constitutes, in combination with the npn transistors T32 and T33 and the diode D8, a current amplifier functioning as a logic gate 5 at the output U2 of which a current will only appear with the source A2 and transistor T31 enabled at the same time.

The output U2 of the logic gate 5 is connected to the emitter of a pnp transistor T21 forming the amplifier 9 connected to the summing node 13.

Thus, the amplifier 9 is coupled to the output U2 of the logic gate 5.

The ON-state sensor 14 comprises an npn transistor T22 having its base and emitter interconnected by means of a diode D3; this sensor 14 is powered from the amplifier 9 via connected of the collector of transistor T21 to the base of the transistor T22.

A diode D4 further connects as inputs the collectors C1 and C2 of the switch SW to the emitter of the transistor T22, which has its collector C22 connected directly to the reset input R2 of the second flip-flop 4.

A pair of serially connected diodes D5 and D6 further connect the base of the transistor T22 to the base B2 of the transistor T2 and constitute said summing node 13.

The OFF-state sensor 12 is formed of a single npn transistor T23 having its emitter connected to the base B1 of the transistor T1 via a resistor R11. The collector C23 of the transistor T23 is connected directly to the reset input R3 of the third flip-flop 6. The sensor 12 is powered from the amplifier 8 through the connection of the base of transistor T23 to the collector C17 of the transistor T17 through the resistor R17.

The current extractor device 10 comprises the npn transistors T24 and T25. The output U2 of the AND gate 5 is also low which causes the ON-state sensor 14 to be off and collectors connected together and to the base B2 of the transistor T2 by means of a lead 15.

The base B25 of the transistor T25 is connected to the emitter of an npn transistor T26, the base of an npn transistor T27, and the emitter E25 of the transistors T25 itself via a resistor R12.

The emitter E25 and emitter E27 of the transistors T25 and T27 are further connected to the high voltage negative supply $V_B$.

The base of the transistor T26 is connected to the respective collectors of the transistors T24 and T27 as well as to the base B25 via the resistors R14 and R13. The base of the transistor T24 is connected between said resistors R13 and R14.

The device 10 is powered from the amplifier 8 by connection of the collector C14 of transistor T14 and C27 of collector transistor T27.

The current extractor device 11 is structurally identical with the device 10, and a description thereof will be omitted. The device 11 is connected to the base B1 of the transistor T1 and is in turn powered from the amplifier 8 and the negative voltage supply $V_B$.

The remainder of the circuit components shown in FIG. 3 constitute conventional connections between the devices described hereinabove and the various power sources; accordingly, they will not be discussed herein.

The operation of the voltage regulator according to this invention will be next described with reference to a starting condition wherein the non-inverting output Q1 of the storage cell 3 is at a logic low, as is the output Q3 of the second storage cell 6. For convenience of illustration, reference will be made hereinafter to the logic levels appearing on the inputs and/or outputs of the inventive regulator components by the abbreviated terms "low" and "high".

Thus, the output Q1 of the cell 3 being at a low, the transistor T9 will be cut off and, therefore, the current sources A2 and A3 will be off. With no current flowing to the base B2 of the transistor T2, the switch SW will be in the OFF state.

Further, the output Q3 of the second cell 6 being also at a low, the output U1 of the AND gate 7 will be at a low and the amplifier 8 held in the OFF state. As a result, the current extracting devices 10 and 11 and the sensor 12 are also off the output U2 of the AND gate 5 is also low which causes the ON-state sensor 14 to be off.

In order to change the state of the switch SW, an enable signal is supplied to the input S1 of the flip-flop 3.

The output Q1 of the flip-flop 3 goes high and constitutes the high input signal to the flip-flop 4 whose output Q2 goes high since this flip-flop switches on the negative-going transition of the signal. Therefore, the logic gate 5 will have both inputs at a high, and produce a high output U2 which enables the ON state of the amplifier 9. Furthermore, the hold source A3 is enabled directly by the transistor T9 as turned on by the high value of the output Q1 of the first flip-flop 3.

Consequently, the transistor T2 will be on, and the switch SW changes from an OFF condition over to an ON condition wherein it interrupts power to the load $R_L$ formed by the interface circuit.

The ON-state sensor 14 will then output a signal to the input R2 of the second flip-flop 4; this signal will switch the output Q2 of the flip-flop 4 to a low value which also induces a low value on the output U2 of the logic gate 5, thus disabling the amplifier 9. As a result, power is removed from the ON-state sensor 14 and the transistors T1 and T2 will only be held on by the weak current supplied by the hold current source A3.

Simultaneously therewith, the inverting output $\overline{Q1}$ of the flip-flop 3 holds the transistor T8, amplifier 8, and current extractor devices 10 and 11 in the OFF state.

In order to turn off the switch SW, a high signal is then passed to the reset input R1 of the flip-flop 3. The output Q1 of that flip-flop will go low and switch off the transistor T9, source A3, and amplifier 9.

However, the inverting output of the flip-flop 3 will be at a high and cause the transistor T8 to be turned on and the output Q3 of the third flip-flop 6 to be held at a high value, which only switches on the negative-going transistion of the signal. Consequently, the amplifier 8 will be activated through the high output U1 of the logic gate 7, and the current supplied by the source A1 amplified and passed to the extractor devices 10 and 11 which pick up or extract current from the bases B2 and B1, respectively, of the transistors T2 and T1, driving the switch SW off.

The output current from the amplifier 8 also powers the OFF-state sensor 12, which will sense the open state of the switch SW and send a signal to the reset input R3 of the flip-flop 6 to switch the output Q3 of that flip-flop to a low value.

The output U1 of the gate 7 is now also switched, and the amplifier 8 is disabled, thereby the extractor devices 10 and 11 and the sensor 12 are turned off.

Thus, the great advantage is afforded that, once the switch SW is turned off, all the circuit devices which partook in turning the switch off are also switched off.

The regulator of this invention also affords the ability to control the on and off phases independetly of the switch state, and therefore, irrespective of whether the switch is in a transient condition between the off and on phase.

As an example, where an on phase is to be initiated while an off phase is being performed, it should be noted that, prior to the transistors T1 and T2 being turned fully off, the output Q3 of the third flip-flop 6 is still at a high because the sensor 12 is yet to activate the input R3 of that flip-flop. Now, by sending a high signal to the set input S1 of the flip-flop 3, the output Q1 will be switched to a high and the inverting output $\overline{Q1}$ to a low, thereby the amplifier 8 and OFF-state sensor 12 are turned off. In this manner, the off phase is terminated in advance by merely initiating the on phase.

The switching voltage regulator according to the invention has, therefore, the great advantage of permitting the opening and closing times of the switch connected to the interface circuit to be reduced as desired, and is specially useful wherever large fluctuations in the output voltage are necessary.

Furthermore, this regulator minimizes the current draw from the various supply sources, and the high on or off currents are cut off after the change of state has been completed.

Another advantage is that the circuits making up this regulator comprise transistors which operate in a non-saturated state, which increases the speed of the whole circuit.

I claim:

1. A switching voltage regulator for an interface circuit in a telephone subscriber line for controlling the on/off states of an electronic switch which includes first and second transistors interconnected in a Darlington arrangement, the regulator comprising:
   an ON-state sensor coupled to the collector of the first transistor;
   an OFF-state sensor coupled to the base of the first transistor;
   a first current extractor device coupled to the base of the first transistor;
   a second current extractor device coupled to the base of the second transistor;
   first and second current amplifiers;
   first and second current sources each having an output coupled respectively to the first and second current amplifiers;
   a third current source;
   the first amplifier having an output coupled to the first and second extractor devices, the second amplifier having an output coupled to the base of the second transistor and the third current source having an output coupled to the base of the second transistor;
   first and second gates, the first gate having a first input coupled to the OFF-state sensor, and the second gate having a first input coupled to the ON-state sensor, the first and second gates each having an output coupled respectively to the first and second amplifiers, a second input of each gate receiving an enable signal;
   the third current source also receiving the enable signal supplied to the second gate.

2. A voltage regulator according to claim 1 wherein the OFF-state sensor and the ON-state sensor are each coupled to and powered from the first and second amplifiers, respectively.

3. A voltage regulator according to claim 1 comprising:
   a first bistable storage cell having a set input for receiving an on signal to turn the switch on, a reset input for receiving an off signal for turning the switch off, an inverting output coupled to the second input of the first gate for supplying an enable signal thereto in response to the off signal, and a non-inverting output coupled to the second input of the second gate for supplying an enable signal thereto in response to the on signal;
   second and third bistable storage cells each having a non-inverting output, a reset input, and a set input and adapted to change state at the non-inverting output on the negative-going transition of a signal applied to the respective set input, the set inputs of the second and third storage cells being coupled to the non-inverting output and inverting output, respectively, of the first storage cell, the non-inverting outputs of the second and third storage cells being coupled to the first input of the second gate and the first input of the first gate, respectively, the reset inputs of the second and third storage cells being coupled to the ON-state sensor and the OFF-state sensor, respectively;
   the third current source being coupled to the non-inverting output of the first storage cell.

4. A voltage regulator according to claim 3 including a transistor having multiple emitters, the non-inverting output of the first storage cell being coupled to the base of the multiple emitter transistor, one emitter of the multiple emitter transistor being coupled to the set input of the second storage cell, another emitter being coupled to the second input of the second gate, and another emitter being coupled into the third current source.

5. A voltage regulator according to claim 3 including a transistor having multiple emitters, the inverting output of the first storage cell being coupled to the base of the multiple emitter transistor, one emitter of the multiple emitter transistor being coupled to the set input of the third storage cell and another emitter being coupled to the first gate.

6. A switching voltage regulator for an interface circuit in a telephone subscriber line for controlling the on/off states of an electronic switch which includes first and second transistors interconnected in a Darlington arrangement, the regulator comprising:
   a first bistable storage cell having a non-inverting output and an inverting output, and set and reset inputs for respectively receiving an on signal and an off signal for turning the swtich on and off;
   second and third bistable storage cells each having a non-inverting output, a reset input, and a set input the set input of the second storage cell being coupled to the non-inverting output of the first storage cell, the set input of the third storage cell being coupled to the inverting output of the first storage cell, the second and third bistable storage cells changing state on a negative-going transition of the signal applied to the respective set input;
   an ON-state sensor coupled to the collector of the first transistor;
   an OFF-state sensor coupled to the base of the first transistor;
   a first current extractor device coupled to the base of the first transistor;
   a second current extractor device coupled to the base of the second transistor;
   first, second and third current sources each having an output;
   first and second current amplifiers respectively coupled to the outputs of the first and second current sources;
   the first amplifier having outputs coupled to the first and second extractor devices, the second amplifier having an output coupled to the base of the second transistor and the output of the third current source being coupled to the base of the second transistor;
   the first amplifier being coupled to the output of the third storage cell and the second amplifier being coupled to the output of the second storage cell;
   the second and third storage cells having their reset inputs respectively coupled to the ON-state sensor and the OFF-state sensor;
   the first current source being coupled to the inverting output of the first storage cell;
   the second current source and the third current source being coupled to the non-inverting output of the first storage cell.

7. A switching voltage regulator comprising:
   first and second transistors interconnected in a Darlington arrangement;
   an ON-state sensor coupled to the collector of the first transistor;
   an OFF-state sensor coupled to the base of the first transistor;
   a first current extractor coupled to the base of the first transistor;
   a second current extractor coupled to the base of the second transistor;
   control means coupled to receive an on signal for turning the first and second transistors on, an off signal for turning the first and second transistors off, and coupled to a source of power, the base of the second transistor, the ON-state sensor, the OFF-state sensor, the first current extractor and the second current extractor;
   the control means, in response to the on signal, coupling current from the source of power to the base of the second transistor to turn the first and second transistors on and the ON-state sensor on, the control means in response to an ON-state signal from the ON-state sensor turning the ON-state sensor off;
   the control means in response to an off signal ceasing coupling of current from the power source to the base of the second transistor and turning the first and second current extractors on to cause the first and second transistors to turn off, and turning the OFF-state sensor on, the control means in response to an OFF-state signal from the OFF-state sensor turning the first and second current extractors off and the OFF-state sensor off.

8. The voltage regulator of claim 7 wherein the control means includes:
   a first current amplifier coupled to the source of power, the first and second current extractors and the OFF-state sensor;
   a second current amplifier coupled to the source of power and to the ON-state sensor; and
   means receiving the on and off signals for turning the first and second current amplifiers on and off in response to the on and off signals;
   the first current amplifier when turned on turning the first and second current extractors on and the OFF-state sensor on, and when turned off turning the first and second current extractors off and the OFF-state sensor off;

the second current amplifier when turned on turning the ON-state sensor on, and when turned off turning the ON-state sensor off.

9. The voltage regulator of claim 8 wherein the means turning the first and second current amplifiers on and off includes a first switch coupled between the source of power and the first amplifier, a second switch coupled between the source of power and the second amplifier, and logic circuitry coupled to receive the on and off signals and the ON-state and OFF-state signals and coupled to the first and second switches and the first and second current amplifiers, the logic circuitry turning the first and second switches on and off in response to the on and off signals and turning the first and second current amplifiers on and off in response to the on and off signals and the ON-state and OFF-state signals.

10. The voltage regulator of claim 9 wherein the logic circuitry comprises;
a first bistable device having a first input coupled to receive the on signal, a second input coupled to receive the off signal, a first output coupled to the first switch and a second output coupled to the second switch;
a second bistable device having a first input coupled to the second output of the first bistable device, a second input coupled to the ON-state sensor, and an output;
a third bistable device having a first input coupled to the first output of the first bistable device, a second input coupled to the OFF-state sensor, and an output;
a first AND gate having a first input coupled to the output of the third bistable device, a second input coupled to the first output of the first bistable device and an output coupled to the first current amplifier;
a second AND gate having a first input coupled to the output of the second bistable device, a second input coupled to the second output of the first bistable device and an output coupled to the second current amplifier.

11. The voltage regulator of claim 9 wherein the control means includes a third switch coupled between the source of power and the base of the second transistor and coupled to the logic circuitry, the logic circuitry turning the third switch on and off in response to the on and off signals; and wherein the logic circuitry comprises;
a first bistable device having a first input coupled to receive the on signal, a second input coupled to receive the off signal, a first output coupled to the first switch and a second output coupled to the second switch;
a second bistable device having a first input coupled to second output of the first bistable device, a second input coupled to the ON-state sensor, and an output;
a third bistable device having a first input coupled to the first output of the first bistable device, a second input coupled to the OFF-state sensor, and an output;
a first AND gate having a first input coupled to the output of the third bistable device, a second input coupled to the first output of the first bistable device and an output coupled to the first current amplifier;
a second AND gate having a first input coupled to the output of the second bistable device, a second input coupled to the second output of the first bistable device and an output coupled to the second current amplifier.

12. A switching voltage regulator comprising:
first and second transistors interconnected in a Darlington arrangement;
an ON-state sensor coupled to the collector of the first transistor and providing an ON-state signal when the first transistor is on;
an OFF-state sensor coupled to the base of the first transistor and providing an OFF-state signal when the first transistor is off;
a first current extractor coupled to the base of the first transistor;
a second current extractor coupled to the base of the second transistor;
a first current amplifier coupled to a source of power, the first and second current extractors and the OFF-state sensor;
a second current amplifier coupled to the source of power and to the ON-state sensor;
a first switch coupled between the source of power and the first amplifier;
a second switch coupled between the source of power and the second amplifier;
a third switch coupled between the source of power and the base of the second transistor;
logic circuitry coupled to receive an on signal and an off signal, and the ON-state signal from the ON-state sensor and the OFF-state signal from the OFF-state sensor and coupled to the first, second and third switches and the first and second current amplifiers;
the logic circuitry:
turning the first switch on in response to the on signal and off in response to the off signal;
turning the second and third switches on in response to the off signal and off in response to the on signal;
turning the first current amplifier off in response to the OFF-state signal; and
turning the second current amplifier off in response to the ON-state signal;
the first current amplifier when the first switch is turned on turning the first and second current extractors on and the OFF-state sensor on, and when turned off turning the first and second current extractors off and the OFF-state off;
the second current amplifier when the second switch is turned on turning the ON-state sensor on and the second current amplifier on, and when turned off turning the ON-state sensor off.

* * * * *